July 20, 1965  J. A. FELDMAN  3,195,351
FLUID METER
Filed July 24, 1961  2 Sheets-Sheet 1
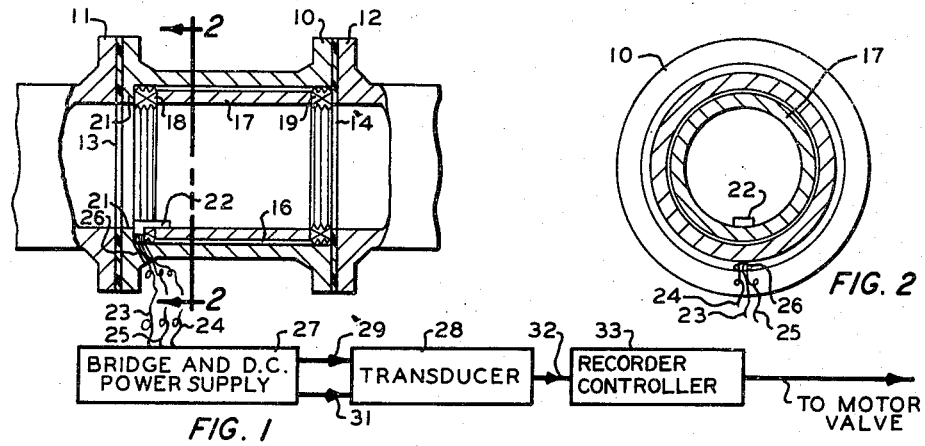
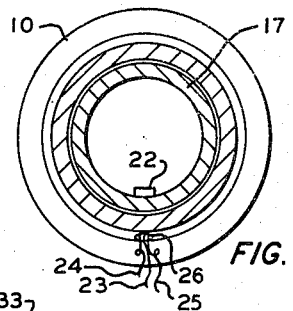
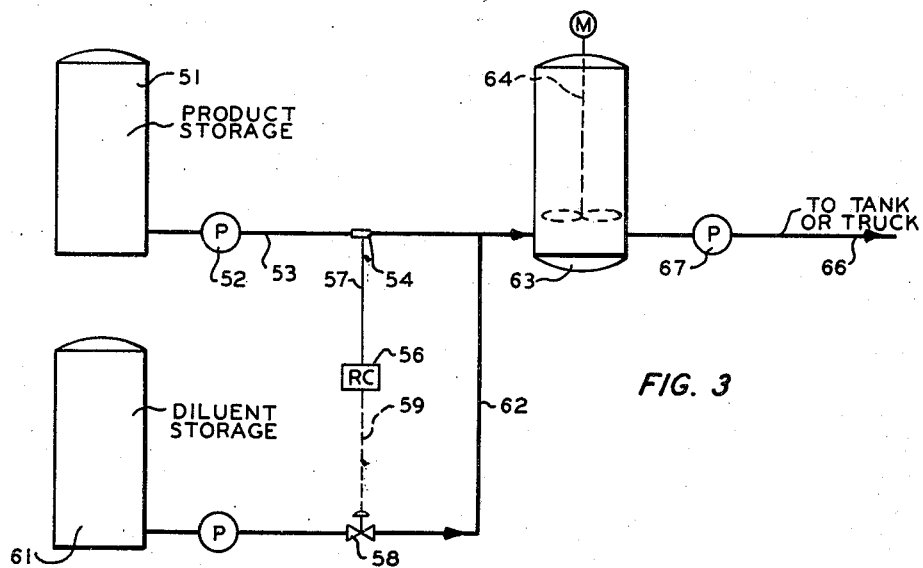
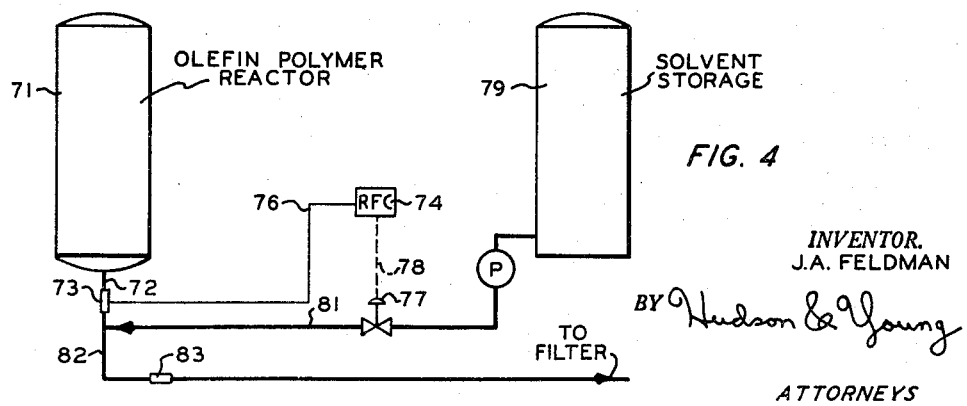
INVENTOR.
J.A. FELDMAN
BY Hudson & Young
ATTORNEYS July 20, 1965     J. A. FELDMAN     3,195,351
FLUID METER Filed July 24, 1961     2 Sheets-Sheet 2

INVENTOR.
J. A. FELDMAN

BY Young & Quigg

ATTORNEYS

United States Patent Office 3,195,351
Patented July 20, 1965

3,195,351
FLUID METER
James A. Feldman, Bartlesville, Okla., assignor to Phillips Petroleum Company, a corporation of Delaware
Filed July 24, 1961, Ser. No. 126,281
10 Claims. (Cl. 73—194)

This invention relates to fluid meters.

There are available many instruments designed to measure fluid flows of widely varied viscosities. Most of these, however, employ impellers, vanes, orifices, and the like, disposed in the flow path of the fluid to be measured. All of these have the feature of reducing the cross-sectional area of the flow path by relying on a fixed obstruction disposed therein.

Such meters are less than desirable when measuring the flow rates or viscosities of highly viscous materials, such as heavy oils and residuums, or of fluids carrying particulate material, such as slurries of fluid catalysts in polymer solutions. In the former instance, flow constrictions may change laminar to turbulent flow also causing perhaps undersirable pressure loss. In the latter case, particulate materials tend to settle out and accumulate at the obstructions in the prior art flowmeters, eventually restricting the conduit flow, if not plugging it completely.

It is, therefore, an object of this invention to provide a fluid meter which is free of the aforediscussed deficiencies.

It is another object to provide a fluid meter which omits the need for components being disposed as obstructions directly in the fluid flow path.

It is a further object to provide a viscometer suited to measure high viscosity fluids flowing at high velocities.

It is a still further object to preclude plugging of flow conduits by fluids high in particulate materials content.

It is a yet further object to simplify the measurement of corrosive fluid flows by reducing the size of the flowmeter components which must be specially designed to withstand exposure to such fluids.

Various other objects, advantages and features of this invention will become apparent to those skilled in the art without departing from the scope and spirit of this invention and it should be understood that the latter is not necessarily limited to the aforementioned discussion and accompanying drawing, in which:

FIGURE 1 is a vertical, sectional view of a fluid meter system constructed in accordance with this invention;

FIGURE 2 is a sectional view taken along the line 2—2 of FIGURE 1;

FIGURE 3 is a flow diagram showing the meter of this invention employed as a flowmeter-flow controller;

FIGURE 4 is a flow diagram, the meter of this invention employed as a viscometer-flow controller;

Figure 5:
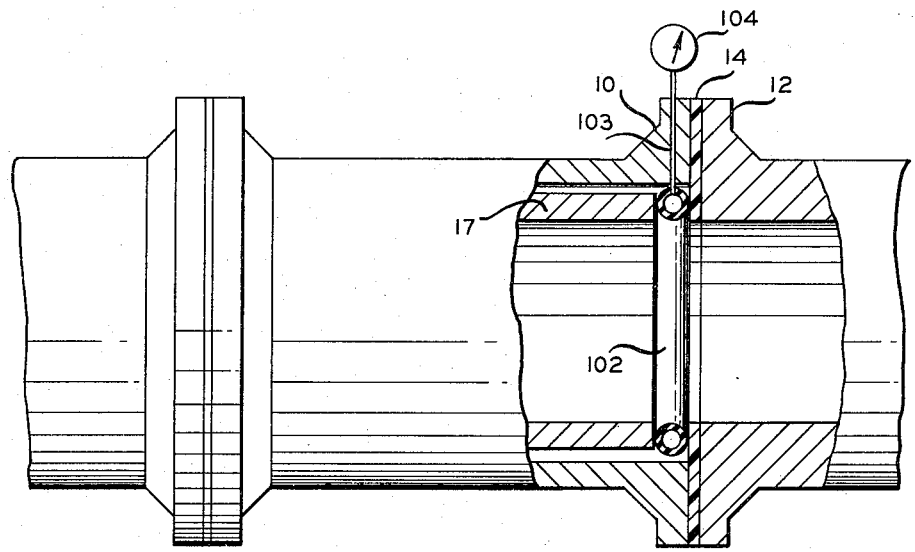
FIGURE 5 is a vertical, sectional view of a fluid meter system constructed in accordance with one embodiment of this invention.

According to my invention, there is provided a surface of predetermined area which is in frictional engagement with the fluid stream whose velocity or viscosity is to be measured. Thus, the viscous drag upon the surface is proportional to the static viscosity and velocity of the stream relative to the surface.

Assuming that the static viscosity remains substantially constant during the interval when flow is to be determined, it will then be apparent that the viscous drag varies directly in accordance with the velocity of the fluid relative to the surface. As the surface is positioned at a preselected region of the fluid flow path, the actual fluid velocity can be obtained directly from the force exerted on the surface, if the velocity profile is known. That is, it can be calculated from the known properties of fluid viscosity, surface tension, and measured force on the surface. In any event, the flowmeter can be calibrated empirically.

Similarly, the device of this invention may function as a viscometer. Assuming that the flow rate is known it will be apparent that viscous drag on the sleeve is proportional to the viscosity of the fluid at the point of measurement. Here also, the viscosity, usually measured in centipoises, can be calculated from the known properties of the fluid. In any case, the viscometer can be calibrated empirically.

Referring now to FIGURES 1 and 2, wherein I have illustrated a specific embodiment of the invention, a flanged cylindrical member 10 is mounted between two adjacent conduit sections 11 and 12, being sealed by gaskets 13 and 14, respectively. Cylindrical member 10 is preferably of an internal diameter somewhat greater than the diameter of the adjacent conduit sections 11 and 12. In this manner, when the member and sections are assembled, as shown, an annular recess 16 is formed in the inner wall of the flow conduit.

This recess will accommodate a rigid cylindrical sleeve 17 that has dimensions which will cause it to substantially occupy the recess and also have its inner surface aligned with the inner walls of the adjacent conduit sections. In this manner, the sleeve offers only minimal resistance to the flow. In order to prevent the flowing fluid from working between the sleeve and the recess walls, flexible sealing means, such as bellows 18 and 19, connect the respective ends of the sleeve to the adjacent ends of said recess. In this embodiment, member 10 is flanged inwardly at one end 21, preferably the end which is upstream relative to fluid flow therethrough. Thus, when assembling the meter, a sleeve may be readily inserted or removed via the unobstructed end of member 10. However, it is preferable to have sized cylindrical members and sleeve already assembled to replace the unit in use for a previous fluid.

Figure 6:
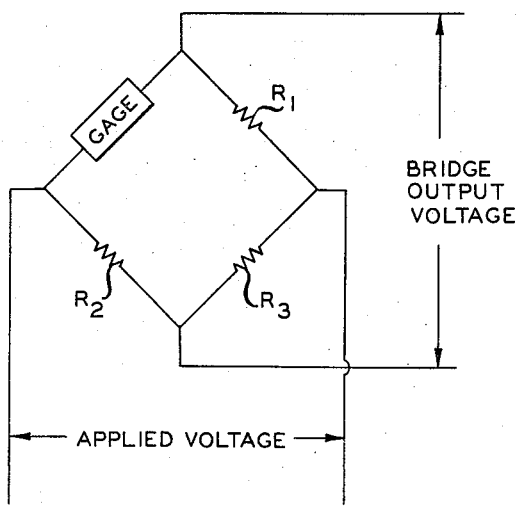
FIGURE 6 is a schematic illustration of a bridge circuit usable with an electrical resistance force measuring device as shown in FIGURE 1.

Disposed within the flow path, and secured to the inside flanged end 21 of member 10 and the upstream end sleeve 17, is a force measuring device 22, such as a strain gauge. This is the preferred position when using a strain gauge which is operative when under tension. Leads 23, 24 and 25 from the gauge pass through the wall of member 10 via a passageway 26, and connect with regulated D.C. power supply and bridge circuit 27. As shown in FIGURE 6, a gauge, such as device 22 of FIGURE 1, is connected in a typical bridge circuit replacing one of the resistance positions. The gauge, an electrical resistance strain gauge is connected so that the only source of unbalance is the change of resistance in the gauge resulting from the application of strain to the gauge. A voltage is applied to the circuit across the gauge and the difference in potential across the output terminals of the circuit becomes a measure of the strain of the gauge. The circuit of FIGURE 6 is typified by item 27 of FIGURE 1. A transducer 28 receives a millivolt signal from bridge circuit and performs its necessary functions to give 3–15 p.s.i. air output—including amplification, conversion of voltage to current, and current to pneumatic output. Component 27 may be one such as is supplied by Electronic Research Associates, Model TR–50, 50 volts D.C., as described in Catalog #120–A, page 2. Component 28 may be an Electronic-Pneumatic Transducer, manufactured by Taylor Instruments Co., Model #700 T, and described in their bulletin 98262, pages 1 to 6.

The pneumatic output from transducer 28, ranging from perhaps 3 to 15 pounds, is passed via line 32 to recorder or controller 33, the latter being capable of use to regulate the flow of fluid in the same or another conduit; as will be described in the examples.

Regarding the design features of the meter of this invention, the dimensions of the elements will depend upon the prospective use. For example, fluids of low viscosity and/or low flow rates will require a relatively larger contacting surface than fluids of high viscosity and/or high flow rates. Thus, the recesses and companion sleeve may vary in dimensions for the type of fluid service contemplated. A number of cylindrical members and sleeves can be made up in varying sizes for ready substitution between the conduit sections. In this manner, the necessary contacting surface for a particular fluid condition can be attained, giving great flexibility to a meter of this type.

Regarding the sizing of the slidable member, it may be determined from another aspect; namely, the magnitude and range of the force required by the particular force sensing member to be employed. In the examples, the magnitude was on the order of 0.2 pound, so as to actuate the particular force measuring device employed there; namely strain gauges.

The force measuring device is not limited to a strain gauge secured to the inside of the flow conduit, but may employ other means responsive to the force exerted on the slidable member.

In another embodiment, as shown in FIGURE 5, a liquid-filled pressure cell, a resilient do-nut shaped chamber 102, is positioned between the downstream end of the slidable member 17 and the abutting sealing gasket 14, in the place of the bellows 19, shown in FIGURE 1. As force is exerted on the member 17, it transmits the same to the pressure cell 102 which communicates through a passage 103 in the wall of cylindrical member 10 with a direct pressure indicating device 104, previously calibrated to measure the force exerted on the slidable member.

In a third embodiment, the bellows, such as 19 of FIGURE 1, are operatively connected to a displacement gauge, which has been calibrated in proper units to reflect the force exerted.

The invention will now be described in connection with two specific applications, one as a combined flowmeter-flow controller, and the other as a viscometer-viscosity controller.

*Example I*

In asphalt handling operations, asphalt is often cutback with a hydrocarbon diluent for ease in transport and application. Also, it may be desired to have a given proportion of diluent in the delivered cutback asphalt to give a desired rate of cure. Asphalt, as stored, is a quite viscous material, even at 275° F. where it is pumpable. The stored material will, however, be at a constant viscosity at a given temperature.

In FIGURE 3, heated, viscous asphalt is drawn from storage tank 51 by pump 52 disposed in outlet conduit 53. The asphalt has a temperature of 275° F., a specific gravity of 0.946, and a viscosity of 1600 Saybolt Furol seconds. Downstream of pump 52 is disposed a flowmeter 54 and necessary circuits, constructed and assembled, as described in connection with FIGURE 1. In this particular embodiment, the slidable cylindrical sleeve has dimensions of one foot in length and has 2 inches inside diameter, for a total fluid contacting surface of about 75 square inches. The flow rate employed is 100 gallons per minute. Under the recited conditions, the viscous drag on the slidable member is calculated as on the order of about 0.2 pound. Here viscosity and temperature are substantially constant, and flow is varied to accommodate loading speed.

The flowmeter circuit, which is previously calibrated, will, when asphalt flow starts through conduit 53, transmit a pneumatic signal to ratio controller 56 via 57. Ratio controller 56 is operatively connected to motor valve 58 via line 59, and signals valve 58 to permit a preset proportional diluent flow from diluent storage tank 61 via conduit 62. This will permit a desired ratio of diluent to asphalt to enter mixing vessel 63, via line 53, having a mixing means 64 disposed therein. Blended "cutback" asphalt of desired specifications, is withdrawn for loading via conduit 66 and pump 67.

*Example II*

In some processes for the polymerization of olefins, the effluent from the reaction zone carries a catalyst, which is a particulate material, dispersed in a viscous polymer solution, its viscosity being on the order of 410 centipoises at 200° F. The catalyst is subsequently removed from this solution in a filtration zone, necessarily at a reduced viscosity, which is usually achieved by admixing with a solvent-diluent.

The flow rate and temperature of the reactor effluent are substantially constant, but the effluent viscosity is subject to variation. In order to conserve diluent during periods of low viscosity of the effluent, and, on the other hand, to insure adequate dilution when effluent viscosity is high, the meter of this invention is utilized as a viscometer-viscosity controller to adjust the diluent addition rate to achieve optimum filtration conditions.

In FIGURE 4, the reactor effluent from an olefin polymerization reactor 71 passes from the bottom portion thereof via conduit 72. Disposed in conduit 72 is viscometer and necessary circuits 73, constructed and assembled, as described in connection with FIGURE 1. In this embodiment, the sleeve member of the meter is one foot in length, and has an inside diameter of two inches, for a total fluid contacting surface of about 75 square inches. The flow rate employed is 100 gallons per minute. Under the recited conditions of flow rate, effluent viscosity, and contacting area, viscous drag is calculated to be on the order of 0.2 pound, and is exerted on the slidable member.

The viscometer circuit, which is previously calibrated, will transmit a pneumatic signal to recorder-controller 74 via line 76. Controller 74 is operatively connected to motor valve 77 via line 78, and controls valve 77 to increase or decrease diluent flow from tank 79 through conduit 81 into effluent conduit 72. This will permit adjustment of the effluent viscosity to the desired level upon its entry via conduit 82 into a mixing zone 83, and thence to filtration process step for catalyst removal in a filter zone (not shown).

Various modifications and alterations of this invention will become apparent to those skilled in the art without departing from the scope and spirit of this invention and it should be understood that the latter is not necessarily limited to the aforementioned discussion.

I claim:

1. A fluid meter comprising, in combination: a conduit adapted to convey a fluid stream; an annular recess in the inner wall of said conduit; a hollow rigid member slidably disposed within said recess and substantially occupying the same, said member having only its inner surface in engagement with fluid flowing through said conduit; and means to determine the force exerted by said flowing fluid on said slidable member as representative of a characteristic property of said fluid.

2. A fluid meter in accordance with claim 1 in which said member is a cylindrical sleeve and the axis of said sleeve coincides with the direction of fluid flow through said conduit.

3. A fluid meter in accordance with claim 1 in which flexible sealing means connect the respective ends of said member to the adjacent ends of said recess.

4. A fluid flow measurement system comprising, in combination: a conduit adapted to convey a fluid stream; an annular recess in the inner wall of said conduit, a rigid cylindrical sleeve slidably disposed within said recess and substantially occupying the same, said sleeve having only its inner surface in engagement with said fluid stream flowing through said conduit; flexible sealing means connecting the respective ends of said member to the adjacent ends of said recess; means to indicate the force exerted by the flowing fluid stream on said slidable sleeve; means operatively connected to said force indicating means providing a detectable output signal; and means responsive to said output signal for quantitatively measuring the same as representative of a characteristic property of said fluid.

5. A fluid meter in accordance with claim 4 in which said force determining means is an electrical strain gauge.

6. A fluid meter in accordance with claim 4 in which said signal providing means is a bridge circuit.

7. A fluid meter in accordance with claim 4 in which said means responsive to said output signal is a recorder controller.

8. A fluid meter comprising first and second spaced conduits positioned coaxial of one another; a third conduit positioned between said first and second conduits and coaxial therewith, the ends of said third conduit being spaced from the respective adjacent ends of said first and second conduits; flexible sealing means connecting the ends of said third conduit to the respective adjacent ends of said first and second conduits; and a force measuring means extending between said third conduit and said first conduit so that the force exerted by fluid flow through said conduits, which tends to displace said third conduit relative to the first and second conduits, is transmitted to said force measuring means.

9. A fluid meter in accordance with claim 8 wherein said force measuring means comprises an electrical strain gauge secured to and extending between said third and first conduit means.

10. A fluid meter in accordance with claim 8 wherein said force measuring means comprises a liquid filled pressure cell disposed between said first and third conduit means.

References Cited by the Examiner

UNITED STATES PATENTS

| | | | |
|---|---|---|---|
| 1,814,235 | 7/31 | Trogner. | |
| 2,741,918 | 4/56 | Boisblanc | 73—194 |
| 2,769,337 | 11/56 | Rich | 73—228 X |
| 2,800,794 | 7/57 | Meneghelli | 73—228 |
| 2,896,656 | 7/59 | Allen | 137—92 |

RICHARD C. QUEISSER, *Primary Examiner.*

ROBERT EVANS, JOSEPH S. STRIZAK,
*Examiners.*